(12) United States Patent
Misaizu et al.

(10) Patent No.: US 7,990,579 B2
(45) Date of Patent: Aug. 2, 2011

(54) IMAGE PROCESSING APPARATUS, IMAGE FORMING APPARATUS, AND IMAGE PROCESSING METHOD FOR EDGE DETECTION PROCESSING AND DETERMINATION

(75) Inventors: Toru Misaizu, Kanagawa (JP); Kazuo Asano, Kanagawa (JP); Takeshi Saito, Kanagawa (JP); Kouta Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 982 days.

(21) Appl. No.: 11/730,148

(22) Filed: Mar. 29, 2007

(65) Prior Publication Data

US 2007/0273927 A1    Nov. 29, 2007

(30) Foreign Application Priority Data

May 25, 2006   (JP) .................................. 2006-145213

(51) Int. Cl.
*G06K 15/00* (2006.01)

(52) U.S. Cl. ........ 358/2.1; 358/1.9; 358/3.26; 358/3.27; 382/266

(58) Field of Classification Search .................. 358/1.1, 358/1.9, 2.1, 3.26, 3.27, 538; 382/266, 269
See application file for complete search history.

(56) References Cited

U.S. PATENT DOCUMENTS

| | | | |
|---|---|---|---|
| 4,870,499 A | 9/1989 | Suzuki et al. | |
| 4,893,188 A * | 1/1990 | Murakami et al. | 358/2.1 |
| 5,029,227 A | 7/1991 | Kawamura | |
| 5,432,611 A | 7/1995 | Haneda et al. | |
| 5,473,440 A | 12/1995 | Haneda et al. | |
| 5,493,411 A | 2/1996 | Haneda et al. | |
| 5,610,999 A * | 3/1997 | Bannai et al. | 382/272 |
| 6,459,502 B1 * | 10/2002 | Takamatsu et al. | 358/1.9 |
| 6,631,210 B1 | 10/2003 | Mutoh et al. | |
| 7,043,078 B2 * | 5/2006 | Guleryuz | 382/180 |
| 2007/0070425 A1 * | 3/2007 | Lane | 358/3.06 |

FOREIGN PATENT DOCUMENTS

| | | |
|---|---|---|
| JP | A 62-050979 | 3/1987 |
| JP | A 5-167811 | 7/1993 |
| JP | 09-186866 | 7/1997 |
| JP | 2000-115530 A | 4/2000 |

OTHER PUBLICATIONS

Office Action issued in JP Application No. 2006-145213 on Jun. 15, 2010 (with English translation).

* cited by examiner

*Primary Examiner* — Chan S Park
*Assistant Examiner* — Jamares Washington
(74) *Attorney, Agent, or Firm* — Oliff & Berridge, PLC

(57) ABSTRACT

An image processing apparatus includes: an acceptance section; an edge detection section; and a screen processing section, wherein the edge detection section includes: a first edge determination section that subjects a pixel of interest to edge determination by reference to information about a density of the pixel of interest and information about densities of pixels around the pixel of interest determined by an edge detection window; and a second edge determination section that compares minimum density information among the information about densities of pixels determined by the edge detection window with a predetermined background threshold value, and that redetermines the pixel of interest, which is determined to belong to an edge portion by the first edge determination section, as belonging to anon-edge portion in cases where the minimum density is equal to or greater than the background threshold value.

5 Claims, 8 Drawing Sheets

FIG. 5A

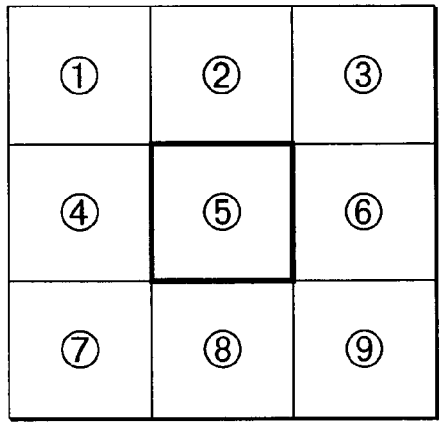

⑤: PIXEL OF INTEREST

Max (SH,SV,SR,SL) ≥ EDGE THRESHOLD VALUE → EDGE PORTION
(LARGE NUMBER OF LINES)

Max (SH,SV,SR,SL) < EDGE THRESHOLD VALUE → NON-EDGE PORTION
(SMALL NUMBER OF LINES)

FIG. 5C

Min (① ~ ⑨) < BACKGROUND THRESHOLD VALUE → EDGE PORTION
(PIXEL OF INTEREST)

Min (① ~ ⑨) ≥ BACKGROUND THRESHOLD VALUE → NON-EDGE PORTION
(PIXEL OF INTEREST)

FIG. 5D

⑤ ≥ AVERAGE VALUE FOR PIXEL OF INTEREST → EDGE PORTION
⑤ < AVERAGE VALUE FOR PIXEL OF INTEREST → NON-EDGE PORTION

FIG. 5E

⑤ ≥ THRESHOLD VALUE FOR PIXEL OF INTEREST → EDGE PORTION
⑤ < THRESHOLD VALUE FOR PIXEL OF INTEREST → NON-EDGE PORTION

FIG. 6A
| 128 | 128 | 128 | 128 | 128 | 128 |
|-----|-----|-----|-----|-----|-----|
| 250 | 250 | 250 | 250 | 250 | 250 |
| 250 | 250 | 250 | 250 | 250 | 250 |
| 128 | 128 | 128 | 128 | 128 | 128 |
| 128 | 128 | 128 | 128 | 128 | 250 |
| 128 | 128 | 128 | 128 | 250 | 250 |
IMAGE DATA: 0 ~ 255
FIG. 6B
| 1 | 1 | 1 | 1 | 1 | 1 |
|---|---|---|---|---|---|
| 1 | 1 | 1 | 1 | 1 | 1 |
| 1 | 1 | 1 | 1 | 1 | 0 |
| 1 | 1 | 1 | 1 | 0 | 0 |
| 0 | 0 | 0 | 0 | 1 | 1 |
| 0 | 0 | 0 | 0 | 1 | 0 |
FIG. 6C
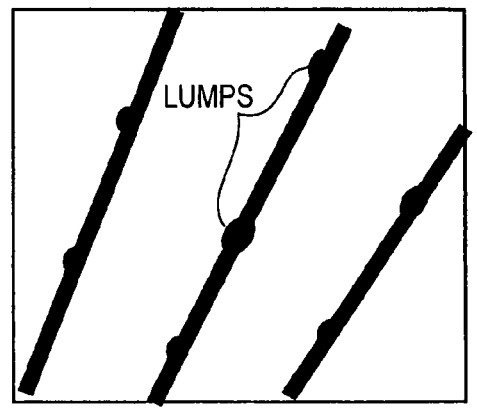
1: DETERMINED TO BELONG TO
    EDGE PORTION → LARGE NUMBER OF LINES
0: DETERMINED TO BELONG TO
    NON-EDGE PORTION → SMALL NUMBER OF LINES
FIG. 6D
| 0 | 0 | 0 | 0 | 0 | 0 |
|---|---|---|---|---|---|
| 1 | 1 | 1 | 1 | 1 | 1 |
| 1 | 1 | 1 | 1 | 1 | 0 |
| 0 | 0 | 0 | 0 | 0 | 0 |
| 0 | 0 | 0 | 0 | 0 | 1 |
| 0 | 0 | 0 | 0 | 1 | 0 |
FIG. 6E
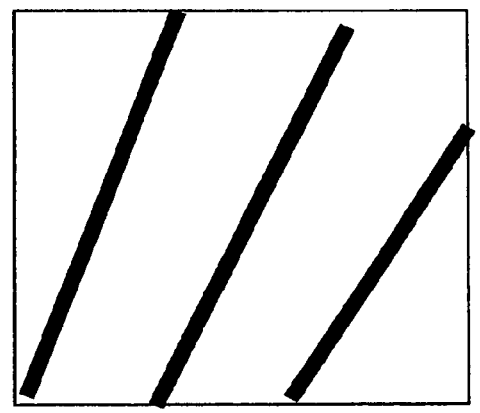
1: DETERMINED TO BELONG TO
    EDGE PORTION → LARGE NUMBER OF LINES
0: DETERMINED TO BELONG TO
    NON-EDGE PORTION → SMALL NUMBER OF LINES

FIG. 7A
| 0 | 140 | 140 | 140 | 140 | 0 |
|---|---|---|---|---|---|
| 140 | 140 | 140 | 140 | 0 | 0 |
| 140 | 140 | 0 | 140 | 140 | 140 |
| 0 | 0 | 0 | 140 | 140 | 140 |
| 0 | 0 | 0 | 140 | 140 | 140 |
| 0 | 0 | 0 | 140 | 140 | 140 |
IMAGE DATA: 0 ~ 255
FIG. 7B
| 1 | 1 | 1 | 0 | 1 | 1 |
|---|---|---|---|---|---|
| 1 | 0 | 0 | 0 | 1 | 1 |
| 1 | 1 | 1 | 0 | 1 | 1 |
| 1 | 1 | 1 | 1 | 0 | 0 |
| 0 | 0 | 1 | 1 | 0 | 0 |
| 0 | 0 | 1 | 1 | 0 | 0 |
1: DETERMINED TO BELONG TO
EDGE PORTION → LARGE NUMBER OF LINES
0: DETERMINED TO BELONG TO
NON-EDGE PORTION → SMALL NUMBER OF LINES
FIG. 7C
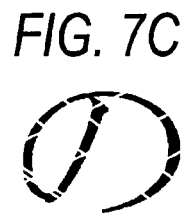
FIG. 7D
| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 1 | 1 | 1 | 1 | 0 | 0 |
| 0 | 0 | 1 | 1 | 0 | 0 |
| 0 | 0 | 1 | 1 | 0 | 0 |
1: DETERMINED TO BELONG TO
EDGE PORTION → LARGE NUMBER OF LINES
0: DETERMINED TO BELONG TO
NON-EDGE PORTION → SMALL NUMBER OF LINES
FIG. 7E

IMAGE PROCESSING APPARATUS, IMAGE FORMING APPARATUS, AND IMAGE PROCESSING METHOD FOR EDGE DETECTION PROCESSING AND DETERMINATION

CROSS-REFERENCE TO RELATED APPLICATIONS

This application is based on and claims priority under 35 U.S.C. 119 from Japanese Patent Application No. 2006-145213 filed May 25, 2006.

BACKGROUND

1. Technical Field

The present invention relates to an image processing apparatus, an image forming apparatus, and an image processing method for generating an image signal which represents gradation, by use of an area coverage modulation method.

2. Related Art

In an electrophotographic or inkjet image forming apparatus such as a copier, a printer, or the like, input image information is subjected to screen processing by means of which pseudo-intermediate gradation is represented by a binary value showing presence/absence of an imaging dot, and a result of screen processing is output by an output device.

Documents created by such an image forming apparatus include various objects from the viewpoint of image quality; e.g., images such as photographs, graphics such as gradations or patches, characters, lines, and the like.

A parameter typifying screen processing includes the number of lines (the number of identical patterns included per inch). The number of lines optimal for the previously-described image object varies from one image object to another.

For instance, 200 lines or more are preferable for an image from the viewpoint of visual characteristics of the human eye. However, when the number of lines is large, a gradation characteristic or granularity is deteriorated by response of a marking engine. In contrast, when the number of lines is small, a screen structure becomes visible, or texture is lost. Accordingly, 170 lines to 230 lines are often used.

In relation to graphics, further emphasis is placed on a gradation characteristic or granularity, and hence 150 lines to 200 lines or thereabouts are often used. In relation to characters and lines, which are desired to include no jagged edges or discontinuities, 300 lines or more are often used.

Specifically, the maximum number of lines is desirable to smoothly represent characters, lines, and the like, but an excessively large number of lines results in deterioration of a gradation characteristic or granularity.

SUMMARY

According to an aspect of the present invention, an image processing apparatus includes: an acceptance section that accepts image information; an edge detection section that subjects the image information accepted by the acceptance section to edge detection; and a screen processing section that subjects the image information to screen processing, which utilizes area coverage modulation, in accordance with a result of detection performed by the edge detection section, wherein the edge detection section includes: a first edge determination section that subjects a pixel of interest to edge determination by reference to information about a density of the pixel of interest and information about densities of pixels around the pixel of interest determined by an edge detection window; and a second edge determination section that compares minimum density information among the information about densities of pixels determined by the edge detection window with a predetermined background threshold value, and that redetermines the pixel of interest, which is determined to belong to an edge portion by the first edge determination section, as belonging to a non-edge portion in cases where the minimum density is equal to or greater than the background threshold value.

BRIEF DESCRIPTION OF THE DRAWINGS

Exemplary embodiment of the present invention will be described in detail based on the following figures, wherein:

FIGS. 5A to 5E are descriptive views of example edge detection operation performed by an edge detection section;

FIGS. 6A to 6E are descriptive views of action of the edge detection operation;

FIGS. 7A to 7E are descriptive views of action of the edge detection operation.

DETAILED DESCRIPTION

An embodiment of the present invention will be described in detail hereunder by reference to the accompanying drawings.

Figure 1:
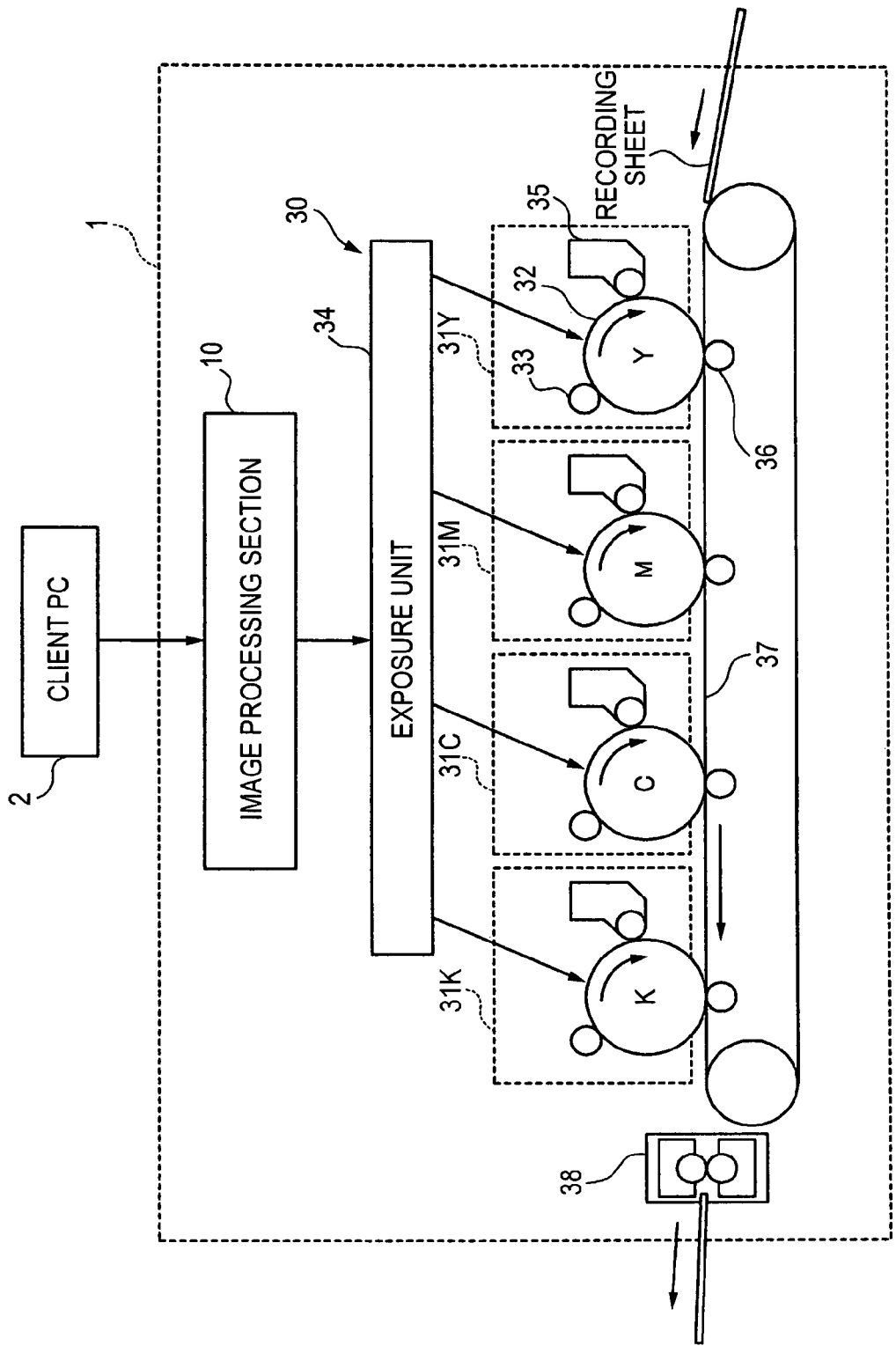
FIG. 1 is a view showing the entire configuration of a printer system to which a mode of an embodiment of the present invention is applied.

FIG. 1 is a view showing the entire configuration of a printer system to which a mode of the present invention is applied. The drawing shows an image forming apparatus 1 which unarchives input information about an electronic document into an image and prints the information in the form of an image; and a client PC (a personal computer) 2 serving as a host computer which provides the image forming apparatus 1 with an electronic document. There may also be a case where image data are input to the image forming apparatus 1 from an unillustrated image reader, or the like, other than the client PC 2.

The image forming apparatus 1 comprises an image processing section 10 which subjects, e.g., image data pertaining to an electronic document output from the client PC 2 to predetermined image processing; and a marking engine 30 serving as an image forming section that is a so-called tandem digital color printer utilizing electrophotography.

The marking engine 30 comprises a plurality of image forming units 31Y, 31M, 31C, and 31K (which are described as image forming units 31 unless otherwise the units must be described on a per-color basis); and an exposure unit 34 for exposing the photosensitive drums 32 of the respective image forming units 31. In short, the image forming apparatus 1 forms a color image.

An image forming unit 31Y forms a yellow (Y) toner image; an image forming unit 31M forms a magenta (M) toner image; an image forming unit 31C forms a cyan (C) toner image; and an image forming unit 31K forms a black (K) toner image. The thus-formed toner images are sequentially transferred to a recording sheet serving as a recording medium.

Although details of an exposure unit 34 are omitted, the exposure unit 34 is a multibeam exposure scanner which collectively causes a plurality of laser beams—which have been emitted from a vertical cavity surface emitting laser chip array having a group of light emitting points formed from a plurality of light emitting points—to effect scanning, thereby guiding the laser beams to photosensitive drums 32 of the respective image forming units 31. As a result, an image can be formed at a resolution of, e.g., 2400 dpi.

Each of the four image forming units 31 has one photosensitive drum 32 serving as an image carrier (i.e., a photosensitive drum) which forms an electrostatic latent image, to thus carry a toner image; an electrifying device 33 for uniformly electrifying the surface of the photosensitive drum 32; and a development unit 35 for developing the electrostatic latent image formed by the exposure unit 34. Each of the image forming units has a transfer roller 36 for transferring a toner image created on the photosensitive drum 32 to a recording sheet.

Moreover, the marking engine 30 has a sheet transfer belt 37 for transporting a recording sheet to a transfer position formed by the corresponding photosensitive drum 32 and a transfer roller 36, which belong to each of the image forming units 31. The marking engine 30 has a fixing device 38 for fixing the toner image transferred onto the sheet.

It may be the case that only the image processing section 10 is grasped as an image processing apparatus rather than the entirety of the image forming apparatus 1 being included in the image processing apparatus.

The image forming units 31 have essentially analogous constituent elements, except for colors of toner stored in development units 35. Image data input from the client PC 2 are subjected to image processing by the image processing section 10, and the thus-processed image data are supplied to the marking engine 30 via a predetermined interface. The marking engine 30 operates in accordance with a control signal, such as a sync signal or the like, supplied from an unillustrated image output control section. First, the yellow (Y) image forming unit 31Y forms, by means of the exposure unit 34, an electrostatic latent image on the surface of the photosensitive drum 32 electrified by the electrifying device 33 in accordance with the image signal supplied from the image processing section 10. The development unit 35 develops the electrostatic latent image, to thus create a yellow (Y) toner image, and the thus-created yellow (Y) toner image is transferred onto the recording sheet on the sheet transfer belt 37 rotating in the direction of an arrow in the drawing through use of the transfer roller 36. Likewise, magenta (M), cyan (C), and black (K) toner images are formed on the respective photosensitive drums 32, and the thus-formed toner images are multilayer-transferred onto the recording sheet on the sheet transfer belt 37 through use of the transfer roller 36. The thus-multilayer-transferred toner image on the recording sheet is transported to the fixing unit 38, where the toner image is fixed on the sheet by means of heat and pressure.

The marking engine 30 of the image forming apparatus 1 shown in FIG. 1 adopts a structure for sequentially transferring toner images on a transported recording sheet. However, there can also be adopted an image forming apparatus of so-called secondary transfer type, wherein an intermediate transfer belt is adopted in lieu of the sheet transfer belt 37, toner images are multilayer-transferred to the intermediate transfer belt, and the thus-transferred toner images are collectively transferred onto a recording sheet through secondary transfer operation.

The image processing section 10, which is a characteristic structure of the mode of the present embodiment, will now be described.

Figure 2:
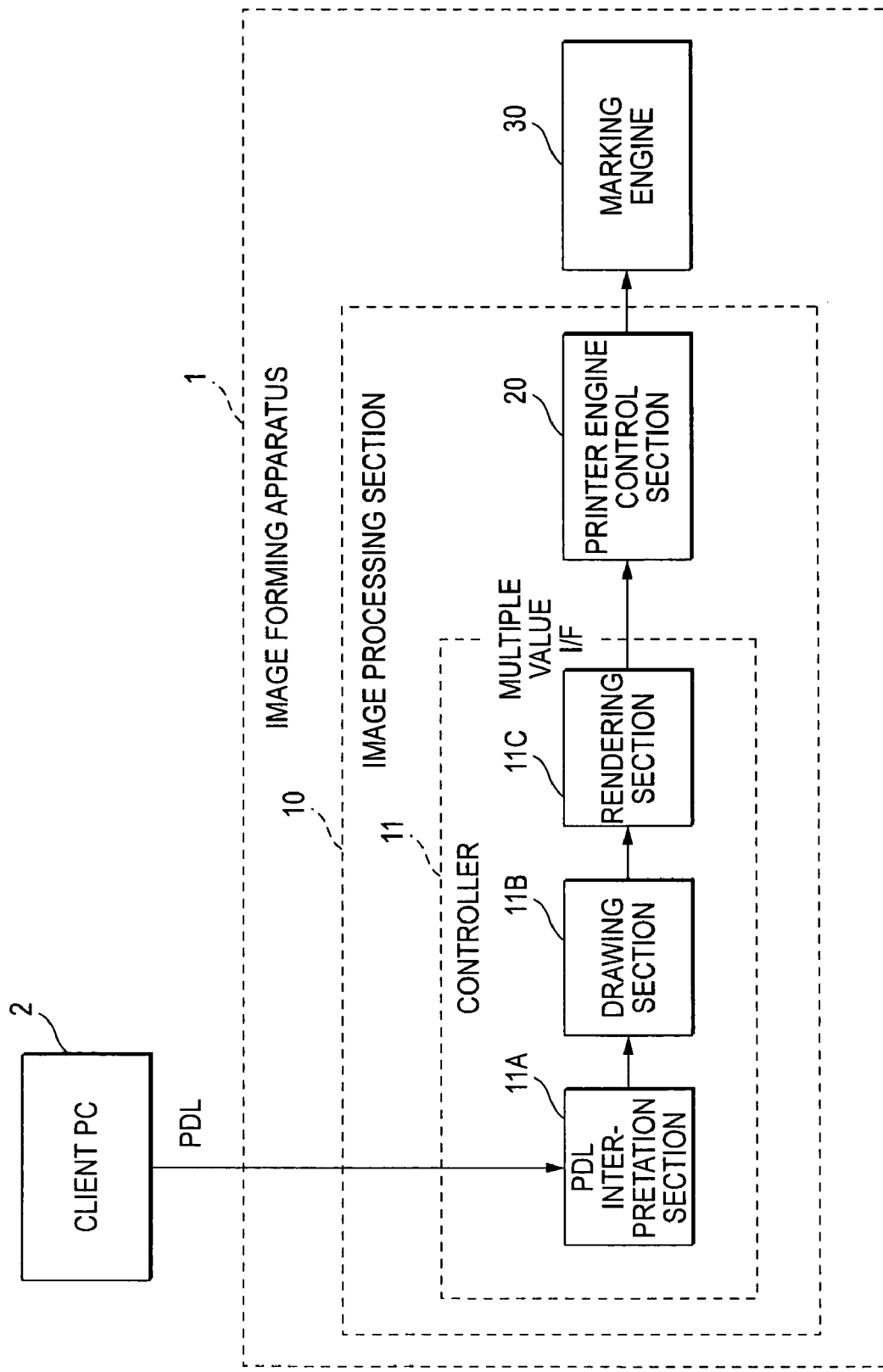
FIG. 2 is a block diagram showing the configuration of an image creation section.

FIG. 2 is a block diagram showing the configuration of the image processing section 10 to which the mode of the present embodiment is applied.

The image processing section 10 broadly comprises a controller 11 serving as reception means, and a printer engine control section 20.

Figure 3:
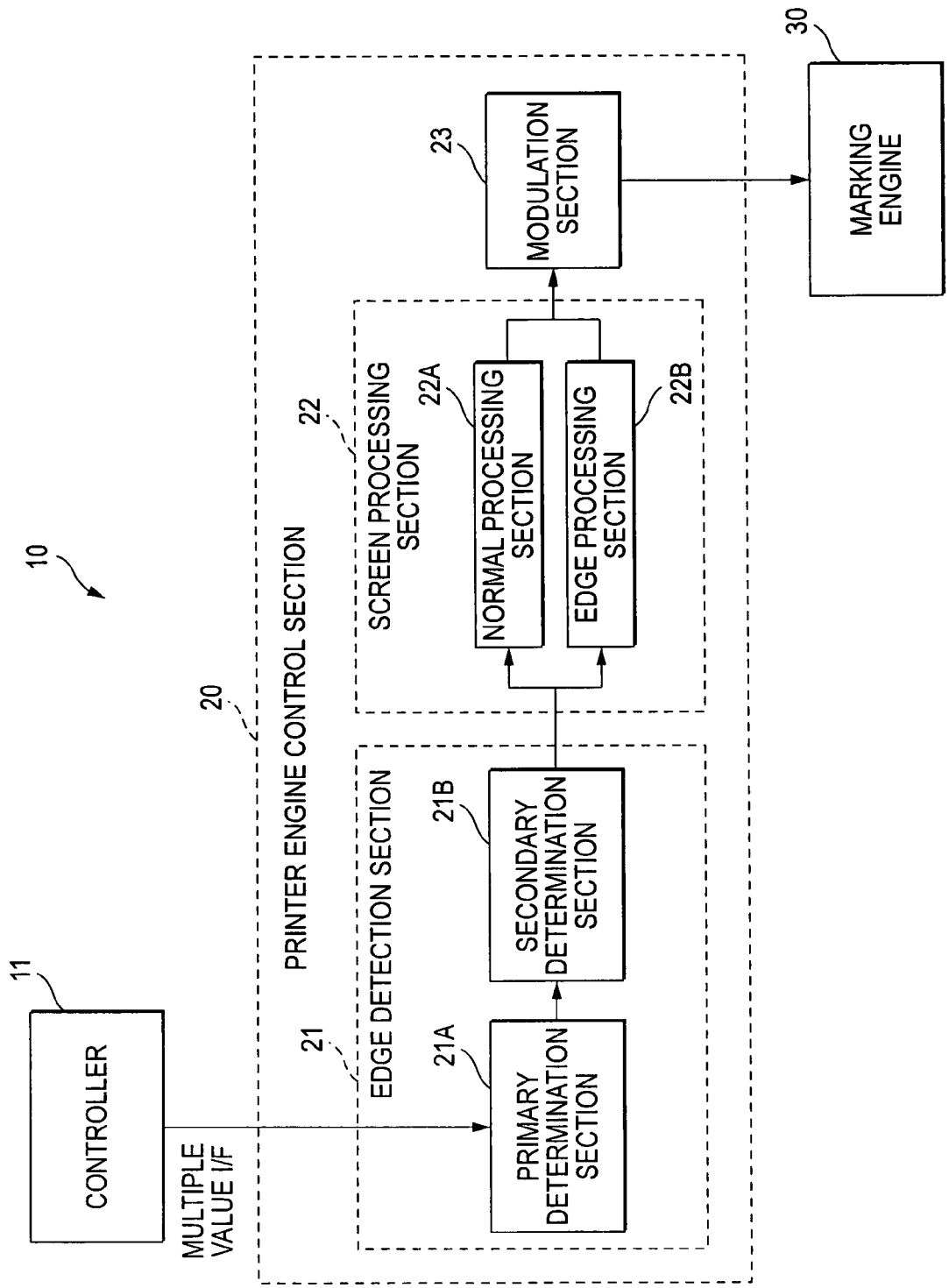
FIG. 3 is a block diagram showing the configuration of a printer engine control section.

FIG. 3 is a block diagram showing the configuration of the printer engine control section 20.

In this illustrated example configuration, image data of PDL (page description language) format are received as image information from an external personal computer (the client PC 2), or the like, and the marking engine 30 forms an image.

Individual operation processing sections will be described hereunder. See FIGS. 2 and 3 for reference symbols of the respective operation processing sections.

The controller 11 has a PDL interpretation section 11A, a drawing section 11B, and a rendering section 11C.

The PDL interpretation section 11A subjects PDL (page description language) data sent from the client PC 2 to command interpretation.

The drawing section 11B converts a color signal (RGB) specified by the interpreted PDL data into a color signal (YMCK) of the marking engine 30. This drawing section 11B converts the resolution of raster data such as an image into the resolution of an engine, and converts image data into raster data of engine resolution in connection with characters/graphics.

The rendering section 11C converts, through rendering, the image data into image data conforming to the printer engine.

The printer engine control section 20 has an edge detection section 21, a screen processing section 22, and a modulation section 23.

The edge detection section 21 determines a difference in density by use of an edge detection window, thereby detecting an edge on a per-pixel basis. The pixels are classified into an edge portion and a non-edge portion, and an edge determination tag (an edge portion tag or a non-edge portion tag) is affixed to the edge. Edge detection performed by the edge detection section 21 will be described in detail later.

The screen processing section 22 performs screen processing (binarization processing) by means of a dithering method, which is one of the area coverage modulation methods. Screen processing is performed by use of a threshold matrix stored in unillustrated memory.

The screen processing section 22 has a normal processing section 22A which effects screen processing with a small number of lines; e.g., 200 lines, and an edge processing section 22B which effects screen processing with a larger number of lines; e.g., 600 lines. In accordance with the edge determination tag affixed by the edge detection section 21, the edge processing section 22B subjects the edge portion to screen processing with a large number of lines; namely, 600 lines. The normal processing section 22A subjects a non-edge portion to screen processing with a small number of lines; namely, 200 lines. As a result, jaggies of the edge portion become unnoticeable.

The modulation section 23 subjects the image data screen processed by the screen processing section 22 to pulse width modulation, and supplies a resultant image signal to the marking engine 30.

Operation of the overall image processing section 10 will now be described according to processes.

Figure 4:
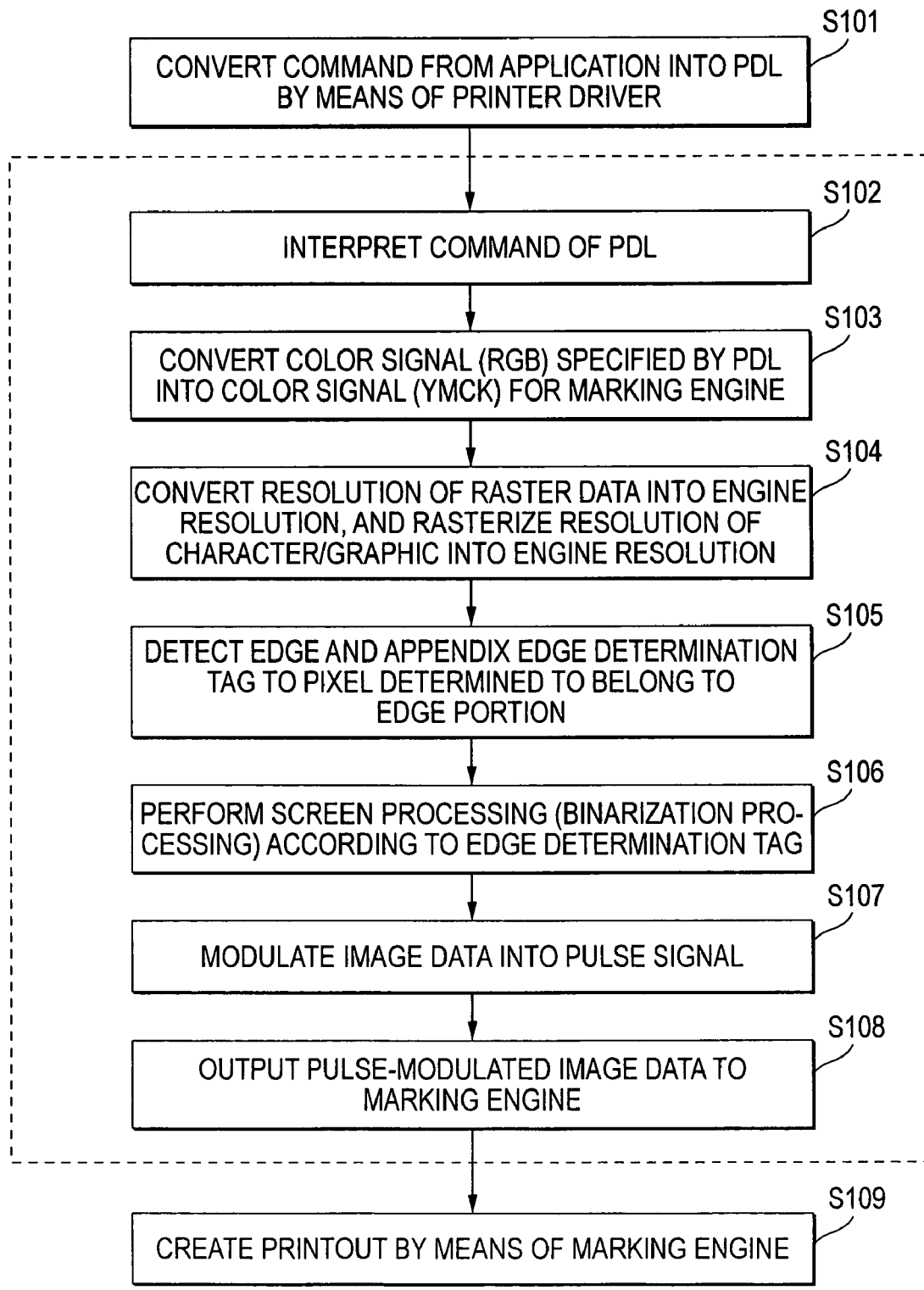
FIG. 4 is a flowchart showing the flow of image processing.

FIG. 4 is a flowchart showing the flow of image processing performed by the client PC 2, the image processing section 10, and the marking engine 30. Processing performed from steps 102 to 108 is to be carried out by the image processing section 10. See FIGS. 2 and 3 for reference symbols of the individual operation processing sections.

First, a command from the application is converted into PDL (page description language) data, or a drawing command of a printer, by means of a printer driver of the client PC 2 (step 101).

The drawing command of the PDL is sent from the client PC 2 to the image forming apparatus 1, and the image processing section 10 of the image forming apparatus 1 interprets the command of the acquired PDL data by means of the PDL interpretation section 11A (step 102).

Subsequently, the drawing section 11B converts a color signal (RGB) specified by the interpreted PDL into a color signal (YMCK) of the marking engine 30 (step S103).

After conversion of the color, the drawing section 11B and the rendering section 11C form a raster image of engine resolution (step S104). The image-data are sent to the printer engine control section 20 by way of, e.g., an 8-bit multiple value interface (I/F).

The printer engine control section 20 detects an edge on a per-pixel basis by means of the edge detection section 21, and affixes an edge determination tag (an edge portion tag or a non-edge portion tag) to a pixel determined to belong to the edge portion and the pixel determined to belong to the non-edge portion (step 105).

Subsequently, the screen processing section 22 performs screen processing for the edge portion and the non-edge portion at different numbers of lines through use of a threshold matrix. Specifically, in relation to the edge portion, the edge processing section 22B performs screen processing with a large number of lines (e.g., 600 lines) in accordance with the edge detection tag affixed by the edge detection section 21. In relation to the non-edge portion, the normal processing section 22A performs screen processing with a small number of lines (e.g., 200 lines) (step 106).

Subsequently, image data pertaining to the edge portion and image data pertaining to the non-edge section, which have separately undergone screen processing, are merged together, and the thus-merged data are input to the modulation section 23. The modulation section 23 modulates, into a pulse signal, the image data having undergone screen processing in the screen processing section 22 (step 107).

The pulse-modulated image data are output to the marking engine 30 (step 108).

The marking engine 30, having acquired image data for a color image on a recording sheet by means of constituent elements such as those shown in FIG. 1, creates the images as a printout (step 109).

The configuration of the edge detection section 21 and operation thereof will now be described in detail.

FIG. 5 is a descriptive view of an example of edge detection, and FIGS. 6 and 7 are descriptive views of action of edge detection operation. As a matter of course, in the following descriptions a pixel of interest to be subjected to edge detection and a background thereof specified by the edge detection window are of the same density and color.

As shown in FIG. 3, the edge detection section 21 has a primary determination section 21A serving as a primary determination section, and a secondary determination section 21B serving as a secondary determination section.

The primary determination section 21A computes and compares the density of a center pixel of interest in the drawing with the density of pixels therearound, by use of an edge detection window of 3×3 pixels such as that shown in, e.g., FIG. 5A, at intervals of every three pixels in each of the longitudinal, lateral, and oblique directions shown in FIG. 5B, thereby determining differences SH, SV, SR, and SL. These differences are compared with a predetermined edge threshold value. When any one of the differences is equal to or greater than the edge threshold value, that pixel of interest is determined to belong to an edge portion. In other cases, pixels are determined to belong to the non-edge portion (determination of a difference in density).

The secondary determination section 21B subjects the result of edge determination rendered by the primary determination section 21A to redetermination. Redetermination includes edge redetermination operation for redetermining the pixel of interest determined to belong to an edge portion and non-edge redetermination operation for redetermining the pixel of interest determined to belong to a non-edge portion.

As shown in FIG. 5C, the edge redetermination operation includes comparing the minimum density in the pixel located within the edge detection window with a predetermined background threshold value. The background threshold value is stored in advance in unillustrated memory. When the minimum density is less than the background threshold value, the pixel of interest is determined to belong to an edge portion. When the minimum density is equal to or greater than the background threshold value, the determination of the pixel of interest determined to belong to the edge portion by the primary determination section 21A is overturned and the pixel of interest is redetermined to belong to the non-edge portion.

According to the edge determination rendered by the primary determination section 21A, there may arise a case where, when a background has a density, a pixel—which is adjacent to the edge portion and originally desired to be determined to belong to the non-edge portion—is determined to belong to an edge portion under the influence of the density of a background. However, by virtue of redetermination performed by the secondary determination section 21B, the pixel—which has been determined to belong to the edge portion under influence of the density of the background and which is originally desired to be determined to belong to the non-edge portion—can be redetermined to belong to the non-edge portion.

Specifically, the primary determination section 21A performs edge detection, such as that shown in FIG. 6B, in relation to the image data shown in FIG. 6A. In the drawing, hatched pixels are pixels which are originally desired to be determined to belong to the non-edge portion but have been determined to belong to the edge portion. When an image is created in accordance with such edge determination information, lumps are formed under the influence of screen processing as shown in FIG. 6C.

As a result of the influence of background density being eliminated by means of edge redetermination operation, the pixel—which is determined to belong to an edge portion by means of the primary determination section 21A and is originally desired to be determined to belong to the non-edge portion—is redetermined as belonging to the non-edge portion as shown in FIG. 6D, so that, as shown in FIG. 6E, a lump-free image can be created.

The background threshold value is changed appropriately in accordance with the mode (the number of lines, an angle, and a shape) of screen processing in a subsequent step. Specifically, when a plurality of screen lines can be specified, background threshold values corresponding to respective numbers of screen lines are set in advance and switched during use. For instance, when the number of screen lines employed for normal processing can be switched in three steps of 150 lines, 200 lines, and 300 lines, a background threshold value of 200 lines is used as a standard. The background threshold value is set higher with 150 lines or lower with 300 lines.

As shown in FIG. 5D, the edge redetermination performed by the secondary determination section 21B may also include, as another configuration, averaging densities of respective pixels in the edge detection window, comparing the average density with the density of a pixel of interest, and redetermining the pixel of interest as belonging to an edge portion when the density of the pixel is equal to or higher than the average density or redetermining the pixel of interest as belonging to a non-edge portion when the density of the pixel is less than the average density.

This configuration enables determination of irregularities in density. Specifically, the density of the pixel of interest being less than the average density of the pixels in the edge detection window shows that the density of that pixel is smaller than the densities of pixels therearound (i.e., the densities are smaller) and has been determined to belong to the edge portion by the primary determination section 21A. As a result of the pixels having smaller densities being redetermined to belong to the non-edge portion as mentioned above, the pixel—which have been determined to belong to the edge portion by the primary determination section 21A and are originally desired to be determined to belong the non-edge portion—can be redetermined to belong to the non-edge portion as in the case of the previous example. A lump-free image can be created.

In the non-edge redetermination operation performed by the secondary determination section 21B, as shown in FIG. 5E, the density of the pixel of interest determined to belong to the non-edge portion by means of the edge determination operation performed by the primary determination section 21A is compared with the predetermined threshold value for the pixel of interest, and the density of the pixel of interest redetermined to belong to the non-edge portion by the edge redetermination operation performed by the secondary determination section 21B is compared with the predetermined threshold value for the pixel of interest.

When the density of the pixel of interest is equal to or greater than the threshold value for the pixel of interest, the pixel is redetermined to belong to the edge portion. When the density of the pixel of interest is less than the threshold value for the pixel of interest, the pixel is redetermined to belong to the non-edge portion.

The reason for this is that, even when the density of the pixel of interest corresponds to intermediate gradation close to the threshold value employed by the primary determination section 21A for edge determination, especially in the case of a character having an intricate edge portion, a determination as to whether a pixel of interest belongs to an edge portion or a non-edge portion is not rendered stably. Even in the case of image data of single density, there may arise a case where the image data are determined to belong to an edge portion in one case and are determined to belong to a non-edge portion in another case. Screen processing of a large number of lines (600 lines) and screen processing of a small number of lines (200 lines) are mixedly performed, which in turn induces a gap in density (a density gap). The density gap is that a deficient density arises, as though eaten by worms, in an area which is to be originally drawn solid in an original predetermined density, thereby degrading image quality.

Specifically, the primary determination section 21A performs edge determination such as that shown in FIG. 7B in connection with the image data such as those shown in FIG. 7A. In the drawings, hatched pixels are pixels which should originally be determined to belong to the edge portion but have been determined to belong to the non-edge portion. When an image is created in accordance with such edge determination information, there may be a case where a gap, such as that shown in FIG. 7C, arises under the influence of screen processing.

For this reason, a pixel of predetermined absolute density (a threshold value for a pixel of interest) or more is redetermined to belong to the edge portion by means of non-edge redetermination operation. As a result, as shown in FIG. 7D, the pixel—which has been determined to belong to the non-edge portion by means of the edge determination rendered by the primary determination section 21A and the edge redetermination and which should originally be determined to belong to the edge portion—is redetermined to belong to the edge portion. Thereby, mixing of screen processing of a large number of lines and screen processing of a small number of lines is eliminated, so that an image which does not involve a density gap can be created as shown in FIG. 7E.

When the pixel of interest has a predetermined density (i.e., the threshold value for a pixel of interest), the pixel is univocally determined to belong to the edge portion regardless of a result of edge determination rendered by the primary determination section 21A. Accordingly, this is the same as the case where the primary determination section 21A does not render an edge determination. However, since the threshold value for a pixel of interest is usually set to a low density, no problem arises in image quality even when a result of edge determination rendered by the primary determination section 21A is not reflected on such a density area.

The threshold value for a pixel of interest is changed appropriately according to the mode (the number of lines, an angle, and a shape) of screen processing performed in a subsequent process. Specifically, when a plurality of numbers of screen lines can be specified, background threshold values corresponding to the respective numbers of screen lines are set in advance and switched during use.

Figure 8:
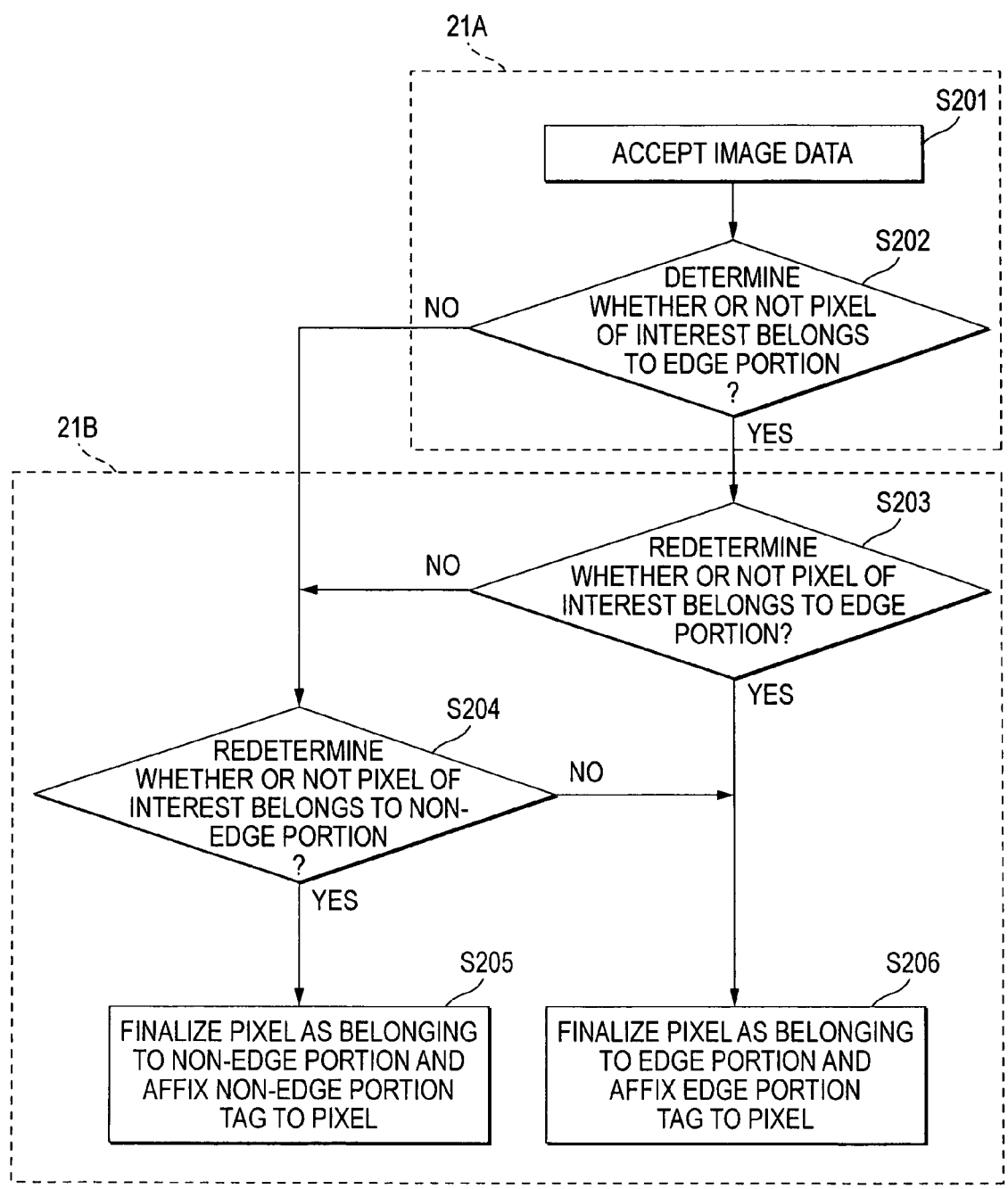
FIG. 8 is a flow of edge detection performed by the edge detection section.

FIG. 8 is the flow of edge detection performed by the edge detection section 21. Processes for detecting an edge will be described according to this flow.

Specifically, an image signal from the controller 11 is accepted (step 201), and the primary determination section 21A subjects the image signal to edge determination (step 202).

Next, when a result of edge determination rendered in step 202 is YES (the pixel of interest is determined to belong to an edge portion), the secondary determination section 21B redetermines whether or not the pixel belongs to the edge portion (step 203).

The pixel of interest determined to belong to the non-edge portion through edge determination processing pertaining to step 202 and edge redetermination processing pertaining to step 203 is subjected to redetermination as to whether or not the pixel of interest belongs to a non-edge portion (step 204). The pixel redetermined to belong to the non-edge portion is finalized as belonging to the non-edge portion and assigned a non-edge portion tag (step 205).

The pixel of interest redetermined to belong to the edge portion through edge redetermination processing pertaining to step 203 and non-edge redetermination processing pertaining to step 204 is finalized as belonging to the edge portion and assigned an edge portion tag (step 206).

The present invention is not limited to the above embodiment and is susceptible to alterations as required.

For instance, the mode of the embodiment set forth corresponds to a case where the present invention is applied to the color image forming apparatus. However, the present invention may also be applied to a monochrome image forming apparatus.

What is claimed is:

1. An image processing apparatus comprising:
an acceptance section that accepts image information;
an edge detection section that subjects the image information accepted by the acceptance section to edge detection; and
a screen processing section that subjects the image information to screen processing, which utilizes area coverage modulation, in accordance with a result of detection performed by the edge detection section,
wherein the edge detection section comprises:
a first edge determination section that determines a pixel of interest by whether the pixel of interest belongs to an edge portion or a non-edge portion by reference to information about a density of the pixel of interest and information about densities of pixels around the pixel of interest determined by an edge detection window; and
a second edge determination section that compares minimum density information among the information about densities of pixels around the pixel of interest determined by the edge detection window only with a predetermined background threshold value, and that redetermines whether the pixel of interest determined by the first edge determination section belongs to the edge portion or the non-edge portion,
wherein, when the first edge determination section determines the pixel of interest belongs to the edge portion in cases where the minimum density is equal to or greater than the predetermined background threshold value,
the second edge determination section overturns a determination of the first edge determination and determines the pixel of interest as belonging to the non-edge portion,
the screen processing section has a plurality of different screen processing modes specifying a plurality of different numbers of screen lines,
the second edge determination section has a plurality of background threshold values,
the plurality of background threshold values are set in advance to correspond to the plurality of different numbers of screen lines, and
the second edge determination section switches the background threshold value according to a number of screen lines.

2. An image forming apparatus comprising:
an image processing section that subjects image information to image processing; and
an image creation section that creates an image on a recording medium in accordance with the image information subjected to image processing by the image processing section,
wherein
the image processing section comprises:
an acceptance section that accepts image information;
an edge detection section that subjects the image information accepted by the acceptance section to edge detection; and
a screen processing section that subjects the image information to screen processing, which utilizes area coverage modulation, in accordance with a result of detection performed by the edge detection section, and the edge detection section comprises:
a first edge determination section determines a pixel of interest by whether the pixel of interest belongs to an edge portion or a non-edge portion by reference to information about a density of the pixel of interest and information about densities of pixels around the pixel of interest determined by an edge detection window; and
a second edge determination section that compares minimum density information among the information about densities of pixels around the pixel of interest determined by the edge detection window only with a predetermined background threshold value, and that redetermines whether the pixel of interest determined by the first edge determination section belongs to the edge portion or the non-edge portion, and which redetermines the pixel of interest, which is determined to belong to the edge portion by the first edge determination section, as belonging to the non-edge portion,
wherein, when the first edge determination section determines the pixel of interest belongs to the edge portion in cases where a minimum density is equal to or greater than the predetermined background threshold value,
the second edge determination section overturns a determination of the first edge determination and determines the pixel of interest as belonging to the non-edge portion,
the screen processing section has a plurality of different screen processing modes specifying a plurality of different numbers of screen lines,
the second edge determination section has a plurality of background threshold values,
the plurality of background threshold values are set in advance to correspond to the plurality of different numbers of screen lines, and
the second edge determination section switches the background threshold value according to a number of screen lines.

3. An image processing method comprising:
acquiring image information;
performing a first edge determination to determine a pixel of interest by whether the pixel of interest belongs to an edge portion or a non-edge portion by reference to information about a density of the pixel of interest and information about densities of pixels around the pixel of interest;
performing a second edge determination that compares minimum density information among the information about densities of pixels around the pixel of interest in the performing of the first edge determination only with one of a plurality of a predetermined background threshold values, and that redetermines whether the pixel of interest determined by the first edge determination section belongs to the edge portion or the non-edge portion,
overturning a determination of the first edge determination to determine that the pixel of interest belongs to the non-edge portion, when the first edge determination determines the pixel of interest belongs to the edge portion and when the minimum density is equal to or greater than the one of a plurality of predetermined background threshold values;
subjecting the image information to screen processing with a plurality of different screen processing modes specifying a plurality of different numbers of screen lines, which utilizes area coverage modulation according to a result of second edge determination;

setting in advance the plurality of background threshold values to correspond to the plurality of different numbers of screen lines; and switching the background threshold value according to a number of screen lines.

4. The image processing apparatus of claim 1, wherein the screen processing section performs screen processing of a higher quality for edge detected pixels and performs screen processing of a lower quality for the non-edge detected pixels.

5. The image processing apparatus of claim 1, wherein the screen processing section performs screen processing of a higher quality for edge detected pixels and performs screen processing of a lower quality for the non-edge detected pixels, the higher quality processing being set to approximately 600 lines and the lower quality screen processing being set to 150-250 lines.

* * * * *